United States Patent [19]
Basturk et al.

[11] Patent Number: 5,635,106
[45] Date of Patent: Jun. 3, 1997

[54] LIQUID CRYSTAL COMPOSITION AND CELLS CONTAINING IT

[75] Inventors: Naci Basturk, Hauterive; Thierry Chuard, Les Geneveyss/Coffrane; Robert Deschenaux, Neuchâtel, all of Switzerland

[73] Assignee: Asulab S.A., Bienne, Switzerland

[21] Appl. No.: 532,015

[22] Filed: Sep. 21, 1995

[30] Foreign Application Priority Data

Sep. 22, 1994 [FR] France ................... 94 11322

[51] Int. Cl.$^6$ ............ C09K 19/52; C09K 19/34; C09K 19/12; C09K 19/20
[52] U.S. Cl. ............ 252/299.01; 252/299.61; 252/299.66; 252/299.67
[58] Field of Search ............ 252/299.01, 299.61, 252/299.66, 299.67

[56] References Cited

U.S. PATENT DOCUMENTS

| | | | |
|---|---|---|---|
| 4,496,497 | 1/1985 | Takiguchi et al. | 252/299.01 |
| 5,155,610 | 10/1992 | Hikmet et al. | 359/75 |
| 5,188,760 | 2/1993 | Hikmet et al. | 252/299.01 |
| 5,210,630 | 5/1993 | Heyndericks et al. | 359/106 |
| 5,304,323 | 4/1994 | Arai et al. | 252/299.5 |

FOREIGN PATENT DOCUMENTS

| | | |
|---|---|---|
| 272585 | 12/1987 | European Pat. Off. |
| 451905 | 10/1991 | European Pat. Off. |
| 541912 | 8/1992 | European Pat. Off. |
| 563403 | 10/1993 | European Pat. Off. |
| 9408268 | 10/1992 | WIPO |
| WO93/03114 | 2/1993 | WIPO |

OTHER PUBLICATIONS

Polymer–Dispersed Liquid Crystals From the Nematic Curvilinear Aligned Phase to Ferroelectric Films; *Liquid Crystals*, vol. 16, No. 1, Jan. 31, 1994, Heinz S. Kitzerow.

*Primary Examiner*—C. H. Kelly
*Attorney, Agent, or Firm*—Sughrue, Mion, Zinn, Macpeak & Seas

[57] ABSTRACT

A liquid crystal composition comprising a low molecular weight liquid crystal in the interior of which a cross-linking network is formed by polymerization of a prepolymer of formula I:

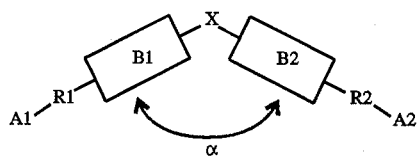

X being a non-mesogenic bivalent radical, the free bonds of which form an angle smaller than 180°;

$B_1$ and $B_2$ being rigid cyclic groups which would confer liquid crystal properties to the prepolymer if X was such that=180°.

$R_1$ and $R_2$ being the same or different, each representing an optionally substituted alkyl, alkoxy, arylalkyl or aralalkoxy chain;

$A_1$ and $A_2$ being the same or different, each representing a reactive polymerizable function. Display cells comprising the liquid crystal composition having a low commutation voltage.

17 Claims, 9 Drawing Sheets

LIQUID CRYSTAL COMPOSITION AND CELLS CONTAINING IT

FIELD OF THE INVENTION

The instant invention relates to a liquid crystal composition in the form of an anisotropic gel which confers upon a liquid crystal cell, provided with electrodes and transparent plates, a high degree of transparency in the non-commutated state and which presents a diffusing state when an only slightly elevated electric field is applied.

The invention also relates to a liquid crystal cell, the liquid crystal composition of which disposed between the plates and the transparent electrodes makes it possible to have a high contrast between the commutated state and the non-commutated state without memory effect, that is without persistence of a display after commutation.

In cells of known type, which make use of modifications in the polarised light (nematic twisted or supertwisted, stabilised ferroelectric surface), by means of polarisers laminated at their surface, the transmission of the visible light in the transparent state is only of the order of 40 to 45% in relation to the air, a value to be compared with that of glass which is of the order of 90 to 92%. This means that about half the visible light is absorbed by the polarisers and that a small part is reflected to the interfaces. To improve this coefficient of transmission, devices have been proposed, the optical effect of which is obtained without using polarisers or dichroic dyes which partially absorb the light.

DESCRIPTION OF THE PRIOR ART

In connection with devices of this type, mention may be made of liquid crystal cells which make use of dynamic diffusion, a process known under the abbreviation DS (dynamic scattering). In cells of this type, the liquid crystal composition disposed between the electrodes essentially comprises a liquid crystal doped by ions of organic salts. In the absence of an electric field, a DS cell is transparent, the liquid crystal molecules being aligned and permitting the passage of light. By applying an electric field, the migration of the ions creates a turbulence which disturbs this alignment and renders the cell opaque. A device of this type nonetheless had to be abandoned since it had the disadvantage of having a very short lifespan because of rapid degradation of the cell due to parasitic electrochemical reactions initiated by the ions.

Another device without a polariser, known under the abbreviation PDLC (Polymer Dispersed Liquid Crystal) consists of using a liquid crystal dispersed in the form of droplets in an isotropic polymer as liquid crystal composition. Using various processes, droplets are created in the polymer inside which the liquid crystals have an inherent alignment, but a random general orientation from one droplet to the next. The cell is therefore opaque in the absence of an electric field. By applying an electric field, the liquid crystals of each droplet adopt the same orientation and the cell becomes transparent. A device of this kind nonetheless has the disadvantage, because of the increase in the surface effect due to the droplets, that a relatively high voltage has to be applied for it to pass from an opaque state to a transparent state with a contrast that is most often mediocre. When the transparent state is the state normally desired, a cell of this type also has the disadvantage of becoming opaque suddenly if there is a failure in the voltage source, which may constitute a risk or a serious drawback if a cell of this type is, for example used as an optical valve.

Moreover, when the polymerisation is effected under ultraviolet radiation in the presence of a photo-initiator, the free radicals created are also responsible for chemical reactions capable of degrading the cell. In relation to the device which will now be analysed, this device can be considered a "normal mode" PDLC display.

For more information on the two preceding types of cell, DS and PDLC, reference may advantageously be made to the work by Biendra Bahadur (Liquid Crystals—World Scientific Publishing Co. Pte. Ltd. 1990).

In a recent patent, EP 0 451 905, the liquid crystal composition described is composed of a liquid crystal b) of low molecular weight inside of which a permanently oriented network is created by polymerisation of a prepolymeric liquid crystal a), under ultraviolet radiation and in the presence of a photoinitiator, that is by polymerisation of a chemical compound, the central mesogenic group of which is capable of maintaining the two rigid cyclic groups of the molecule in the same alignment to confer the properties of a liquid crystal to the polymer thereby obtained.

The compound a) can be diagrammatically represented by the formula II of the formula sheet.

In formula II, Y is a mesogenic group, a simple bond or a radical having a conventional bivalent bond adapted to maintain the alignment of the cyclic systems $B_1$ and $B_2$ substituted respectively by the chains $R_1$ and $R_2$, such as alkyl, alkoxy, aralalkyl or arylalkoxy, said chains having polymerisable reactive terminal groups $A_1$ and $A_2$.

The polymerisation of compound a) is effected in situ in a cell provided with alignment layers, making it possible to obtain in the liquid crystal composition a permanently oriented network presenting a high degree of order. When the compounds a) and b) have positive dielectric anisotropy, the cell presents a transparent state in the non-commutated state and an opaque state when an electric field is applied. Nonetheless, by virtue of the relatively high degree of order of the liquid crystal composition, the threshold voltage which had to be applied to pass from the transparent state to the opaque state is rather high. A cell of this kind is generally designated by the abbreviation PNLC (Polymer Network Liquid Crystal).

BRIEF SUMMARY OF THE INVENTION

It has surprisingly been found that it was possible to improve the general features of a cell of the above-mentioned type by modifying, in the liquid crystal composition, the configuration of the prepolymer a) to obtain a cross-linking network presenting a degree of order intermediate between that of an oriented network obtained using a liquid crystal prepolymer and that of an ordinary network obtained using a strictly isotropic prepolymer.

Whereas the mesogenic linking group —Y— of formula II appeared to be a determining element to obtain a cell of the PNLC type, it has been found that, by replacing this group —Y— by a group —X— breaking the alignment of the moieties $A_1$—$R_1$—$B_1$ and $B_2$—$R_2$—$A_2$, these properties were not only conserved, but also improved, notably at the level of the threshold and saturation voltage.

The liquid crystal composition of the invention is therefore obtained by polymerisation in a liquid crystal of a non-liquid crystal prepolymer corresponding to formula I of the formula sheet, in which:

X is a non-mesogenic bivalent central group the free bonds of which form an angle smaller than 180°, said central group being selected from the groups diphenylether, diphenylmethane, 2,2-diphenyl propane, diphenylthioether, diphenylsulfone and 1,2 or 1,3 phenylene optionally substituted by one or more alkyl, alkoxy, trifluoromethyl or halogene.

$B_1$ and $B_2$ are rigid cyclic groups selected from the groups phenyl, benzoate, biphenyl, pyrimidine, dioxane and cyclohexyl, which would confer liquid crystal properties to the prepolymer if X were selected to give an angle=180°.

$R_1$ and $R_2$ are the same or different, each representing an alkyl, alkoxy, aralalkyl or aralalkoxy chain, which may optionally be substituted;

$A_1$ and $A_2$ are the same or different, each representing a reactive polymerisable function selected from an acrylate, a methacrylate, a vinyl and an epoxy;

Because of its non-linear structure and of the freedom of rotation of part of the molecule around one of the bonds of the bivalent central group —X—, the prepolymer of formula I has greater flexibility than a compound of formula II which, after polymerisation, leads to a cross-linking network less ordered than that obtained with the compound of formula II. It has also been noted that the polymerisation of a prepolymer of formula I under ultraviolet radiation was also possible without addition of photo-initiators and that the electro-optical properties of a cell obtained in this manner were improved thereby. The percentage of prepolymer I in the liquid crystal composition of the invention, which is a function of the solubility of prepolymer I in the liquid crystal b) selected, will generally be comprised between 1% and 20%, preferably between 3% and 8%. Because the optical anisotropy (n) of the liquid crystal b) also influences the intensity of diffusion, it would be desirable to select a liquid crystal of high optical anisotropy, assuming that this choice is compatible with the desired solubility.

Examples of prepolymers according to the invention are represented, without showing the angle α, by the diacrylate of formula Ia of the formula sheet, and by homologs in which the diphenylether central group is replaced by the groups corresponding to the formula Ib to Ig of the formula sheet.

In the description that follows, the electro-optical properties of a cell, the liquid crystal composition of which comprises a diacrylate polymer of formula Ia, will be compared with those of a cell having a liquid crystal composition such as that described in the example of European patent 0 451 905, namely a composition in which the prepolymer corresponds to formula IIa of the formula sheet. It will be noted that formula IIa only differs from the formula Ia in the replacement of the mesogenic bond radical 1,4-phenylene by the group diphenyl ether the free bands of which in para position on the phenyl rings impose an angle of the order of 110°–120° to the parts $A_1$—$R_1$—$B_1$ and $B_2$—$R_2$—$A_2$.

The low molecular weight liquid crystal compound b) used in a liquid crystal composition of the invention can be one of those described in European patent 0 451 905, such as those represented by the formulae IIIa to IIId of the formula sheet, having positive dielectric anisotropy (>0). It may also be a mixture of the above-mentioned liquid crystals. It is also possible to use, as will emerge from the examples hereinafter, a liquid crystal of negative dielectric anisotropy (<0). The liquid crystal composition of the invention may also include, in a manner known per se, a chiral agent to improve the contrast.

The cross-linking network of the liquid crystal composition of the invention may also be obtained by copolymerisation of a prepolymer of formula I and at least one other monomer, liquid crystal or isotrope having a relative concentration comprising between 5% and 50%, preferably between 10% and 20%. The copolymerisable monomer may also be a different prepolymer of formula I.

The prepolymers of formula Ia to Ig, which are new chemical compounds, may be prepared according to the reaction diagram shown by the stages IVa to IVc of the reaction scheme, as explained in further detail hereinbelow.

Synthesis of 4,4'-bis{4-[6-(acryloyloxy)hexyloxy]benzoate}diphenylether (Diacrylate of formula Ia)

The intermediate compounds obtained from the stages IVa and IVb were prepared using the process described by K. Geibel, A. Hammerschmidt, F. Strohmer (*Adv. Mater.* 1993, 5, 107) and obtained with yields of 55% and 93% respectively.

Stage IVc is effected according to the process described by D. J. Broer, J. Boven, G. N. Mol, G. Challa (*Macromol. Chem.* 1989, 190, 2255) for the synthesis of the compound IIa, but by replacing the hydroquinone by 4,4'-dihydroxyphenylether.

To achieve this, 8.00 g (27.0 mM) of benzoic acid obtained in stage IVb were dissolved in 80 ml of 1,2-dimethoxyethane and cooled to −30°, 3.09 g (27.0 mM) of methane sulfonic acid chloride and 5.47 g (54.0 mM) of triethylamine were then added to the solution and the mixture maintained at −30° C. for 1 hour. 2.73 g (13.5 mM) of 4,4'-dihydroxyphenylether and 1.66 g (13.6 mM) of 4-dimethylamino)pyridine were then added to the solution and the mixture was left for 3½ hours at 0° C. It was then hydrolysed with 250 ml of water and extracted with methylene chloride. After extraction, the solvent was removed and 11.7 g of a pale brown oil were obtained which was purified by chromatography on a silica gel column, using a methylene chloride/ethyl acetate (98/2) mixture as eluant. The fractions containing compound Ia were combined and dried over magnesium sulfate. After removal of the solvent and recrystallisation from hot ethyl alcohol the title compound was obtained with a yield of 67.6%, 6.84 g (9.12 mM) in the form of a white crystalline powder having a melting point of 65° and the following elementary analysis:

|  | C % | H % |
| --- | --- | --- |
| Calculated | 70.40 | 6.13 |
| Found | 70.29 | 6.39 |

The NMR spectrum (200 MHz, $CDCl_3$) of compound Ia is as follows: 1.47–1.89 (m, 16H); 4.06 (t, 4H); 4.19 (t, 4H); 5.83 (dd, 2H); 6.13 (dd, 2H); 6.42 (dd, 2H); 6.97 (d, 4H); 7.08 (d, 4H); 8.15 (d, 4H).

It was found by differential thermal analysis and by microscopic examination of heating-cooling cycles that this compound passed by heating from the crystalline phase to the isotropic phase and by cooling from the isotropic phase to the crystalline phase without presenting the intermediate liquid crystal state.

In contrast, the reference compound IIa, the melting point of which is 109° C., presents transition states characteristic for a liquid crystal [109° C. (C/N); 156° C. (N/I-I/N); 92° C. (C/$S_c$); 80° C. ($S_c$/C)].

Synthesis of 4,4'-bis{4-[6-(acryloxyloxy)hexyloxy]benzoate}diphenylmethane (diacrylate of formula Ib)

By repeating the process that has just been described for the synthesis of compound Ia, but by using in the stage IVc 2.48 g (12.4 mM) of bis(4-hydroxy-phenyl)methane in stage IVc, 5.84 g (yield 63%) of the title compound are obtained in colourless crystalline form having the melting point Mp=69° C. and the elementary analysis:

|  | C % | H % |
| --- | --- | --- |
| Calculated | 72.17 | 6.46 |
| Found | 71.98 | 6.45 |

The NMR spectrum (400 MHz, $CDCl_3$) of compound Ib is as follows: 1.43–1.58 (m, 8H); 1.69–1.76 (m, 4H); 1.81–1.88 (m, 4H); 4.02 (s, 2H); 4.05 (t, 4H); 4.18 (t, 4H); 5.82 (dd, 2H); 6.13 (dd, 2H); 6.40 (dd, 2H); 6.96 (d, 4H); 7.13 (d, 4H); 7.24 (d, 4H), 8.13 (d, 4H).

Differential thermal analysis and microscopic examination confirm that the compound obtained does not have liquid crystal properties.

Synthesis of 4,4'-bis{4-[6-(acryloxyloxy)hexyloxy] benzoate}diphenylene-2,2-propane (diacrylate of formula Ic)

According to the same reaction diagram as that of the synthesis of compound Ia, but by using 3.1 g (13.1 mM) of 2,2-bis(4-hydroxyphenyl)propane in the last stage IVc there was obtained 7.91 g (yield 78%) of the title compound in the form of a colourless crystalline powder having the melting point Mp=108° C. and the elementary analysis:

|  | C % | H % |
| --- | --- | --- |
| Calculated | 72.66 | 6.75 |
| Found | 72.41 | 6.65 |

The NMR spectrum (200 MHz, $CDCl_3$) is as follows: 1.47–1.61 (m, 8H); 1.66–1.91 (m, 8H); 1.72 (s, CH); 4.05 (t, 4H); 4.19 (t, 4H); 5.82 (dd, 2H); 6.13 (dd, 2H); 6.41 (dd, 4H; 6.96 (d, 4H); 7.11 (d, 4H); 7.30 (d, 4H), 8.13 (d, 4H).

The compound obtained does not have liquid crystal properties.

In a similar way, compounds of formula Id to Ig have been prepared, the data of which are shown in table I.

TABLE I

|  | Id | Ie | If | Ig |
| --- | --- | --- | --- | --- |
| Melting point | 65° C. | 91° C. | 54° C. | 57° C. |
| C % |  |  |  |  |
| calculated | 68,91 | 66,15 | 69,29 | 69,29 |
| found | 68,82 | 65,98 | 69,20 | 69,12 |
| H % |  |  |  |  |
| calculated | 6,05 | 5,80 | 6,20 | 6,20 |
| found | 6,04 | 5,90 | 6,51 | 6,38 |

BRIEF DESCRIPTION OF THE DRAWINGS

The invention will be better understood from study of the following examples of the embodiment of cells according to the invention with reference to the appended drawings in which.

DETAILED DESCRIPTION OF THE INVENTION

Figure 1:
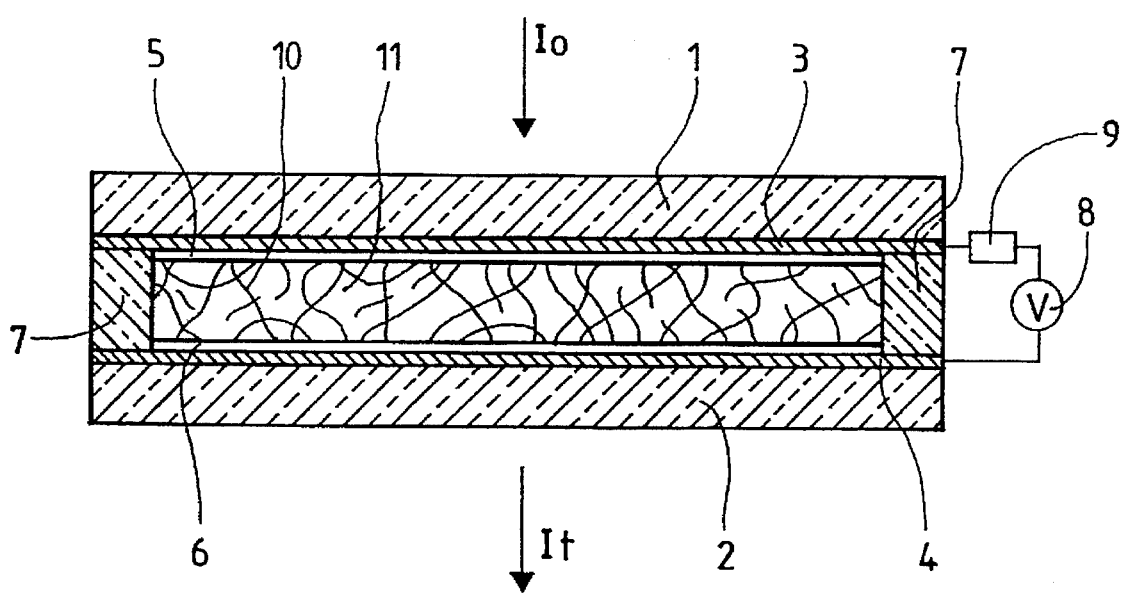
FIG. 1 shows a section through a cell according to the invention.
Figure 2:
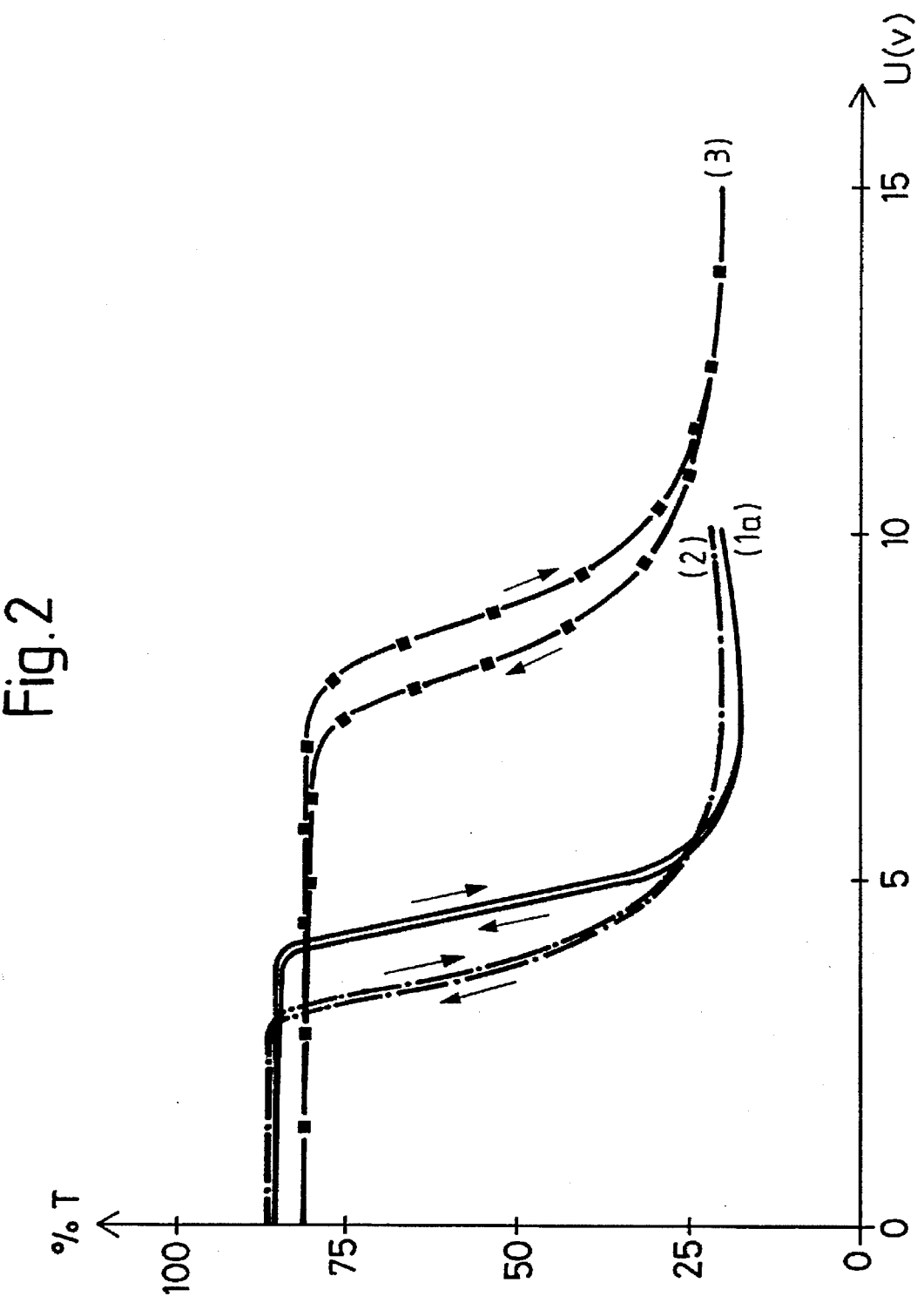
FIGS. 2 to 9 show diagrams giving the transmission percentage T of the cells tested as a function of the applied voltage U expressed in volts.

EXAMPLE 1 (FIGS. 1 and 2)

To produce a liquid crystal composition according to the invention, 5% by weight of compound Ia were dissolved in the liquid crystal E7, which is a known mixture of liquid crystals, of the cyanobiphenyl type of positive dielectric anisotropy, of formulae IIIa, IIIb, IIIc, IIId of the formula sheet in the proportions 51%, 25%, 16% and 8% respectively, said liquid crystal E7 being commercially available from Merck Ltd. (Poole-GB). 0.5% of a chiral agent R 1011 available from Merck Darmstadt was then added. No photo-initiator was added to this mixture. This mixture was then filled into a cell such as that shown in FIG. 1, having two transparent plates 1,2, spaced 9 m apart and provided with transparent electrodes 3,4 (for example of ITO), said electrodes being covered by planar alignment layers 5,6, for example of polyimide. The cell is closed according to conventional methods by means of a sealing frame 7 and the electrodes are connected to a voltage source 8 and to a control circuit 9, making it possible to carry out a scan by increasing and then reducing the voltage. The cell thereby obtained was exposed for 4 hours in a SUNTEST® apparatus manufactured by Original Hanau (Germany) to simulate the composition of sunlight at the zenith in our latitude.

Following completion of the polymerisation, the liquid crystal composition is composed of a network 10 resulting from polymerisation of the compound Ia, impregnated by a continuous phase 11 of the liquid crystal E7.

The electro-optical properties of the cell were then evaluated by measuring, using a microscope equipped with a photomultiplier, the transmission percentage $T=Io/It \times 100$ of the cell as a function of the applied voltage U with a scanning speed of 40 $mv.s^{-1}$ The result of this measurement is represented in FIG. 2 by the curve 1a which shows that a large reduction in transmission (17%) is obtained with a small commutation voltage (about 4.5 V). The arrows represent the direction of voltage scanning. They are not shown in the following figures, it being known that when the curve divides, the outermost curve corresponds to the increase in voltage.

By repeating the experiment carried out in this example 1, but by choosing different liquid crystals, it is noted that the polymerisation of the prepolymer of formula I according to the invention under ultraviolet radiation is always possible without a photo-initiator. By way of illustration, the curves 2 and 3 of FIG. 2 were obtained with the same type of cell, but with different liquid crystals.

Curve 2 was produced using the liquid crystal E63, which is a mixture composed of cyanobiphenyls and phenylbenzoates from Merck Ltd. with 5% by weight of prepolymer Ia and 0.25% of chiral agent R 1011 dissolved therein, the polymerisation always being effected without photo-initiator.

Curve 3 was produced using the liquid crystal TL 205, which is a mixture composed of diphenylethanes, of terphenyls and biphenyls from Merck Ltd. with 5% by weight of prepolymer Ia and 0.25% of chiral agent R 1011 dissolved therein.

EXAMPLE 2 (FIG. 3)

In this experiment, cells were produced by following the manufacturing stages of the cell corresponding to the curve 1a, but by forming the cross-linking network with different prepolymers of the invention. The curve 1b of FIG. 3 corresponds to a cell in which the prepolymer used is the compound Ib, the polymerisation having been effected for about 65 h under ultraviolet radiation without photo-initiator, all the other components of the liquid crystal composition being the same as those used for the cell of curve 1a.

Figure 3:
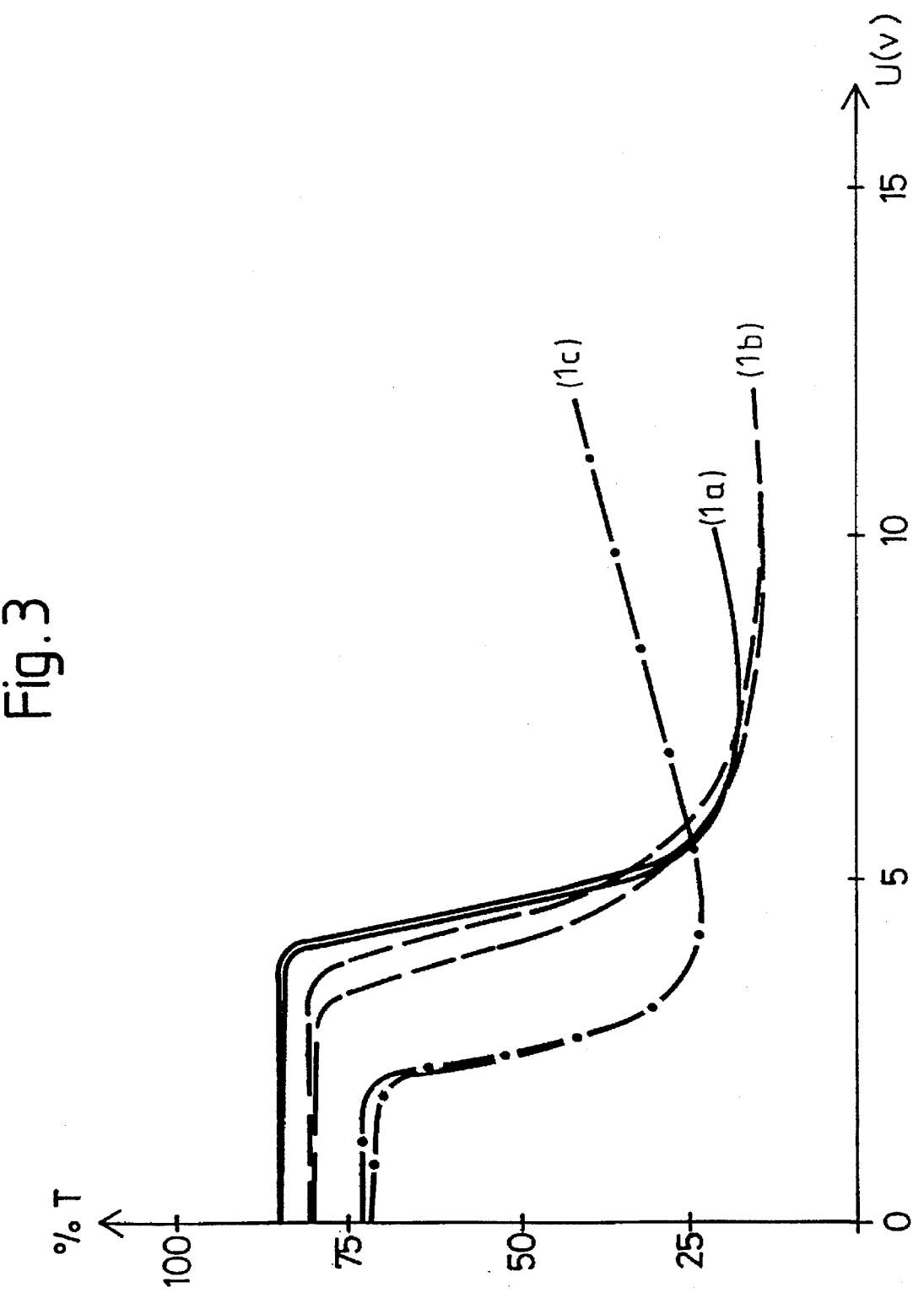

In the same manner, the curve 1c of FIG. 3 corresponds to the prepolymer Ic with a polymerisation time of 21 h.

FIG. 3 also repeats the curve 1a, showing that the three examples of the prepolymer according to the invention have comparable electro-optical behaviour, the rise in the transmission value in curve 1c, when the voltage rises above the value corresponding to the maximum diffusion, being explained by the lower solubility of the prepolymer 1c in the liquid crystal E7.

EXAMPLE 3 (FIG. 4)

Figure 4:
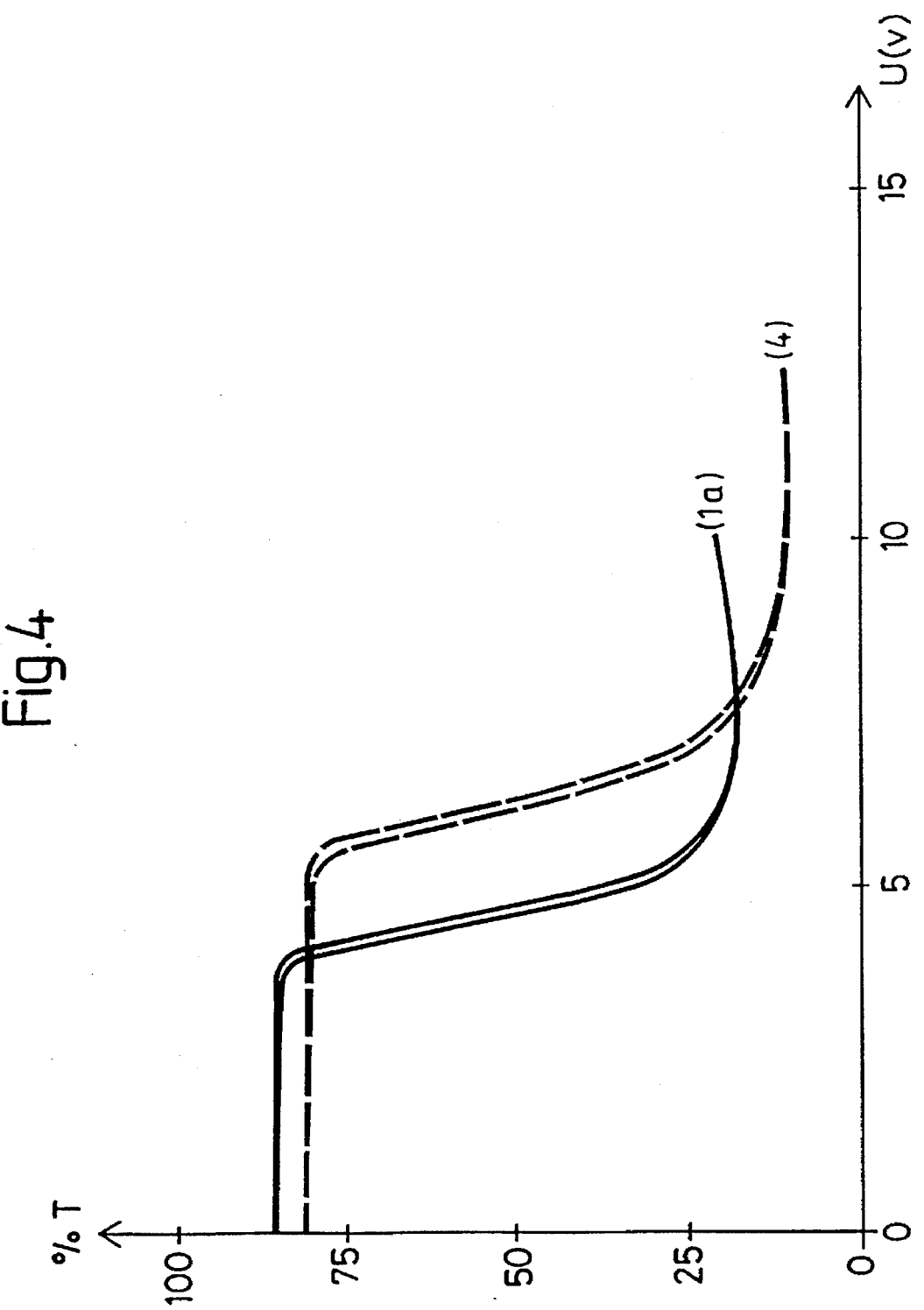

To evaluate the effect of adding a photo-initiator, a cell was produced having the same liquid crystal composition as that corresponding to the diagram 1a, but by adding to the mixture 0.5% of Irgacure® 369, a photo-initiator of the morpholinoketone type commercially available from CIBA-GEIGY. The cell thereby obtained was then exposed to ultraviolet radiation, the transmission percentage as a function of the applied voltage then being measured. The result of this measurement is shown in FIG. 4 by curve 4, which shows that, compared to curve 1a, where the polymerisation was obtained without photo-initiator, the addition of a photo-initiator increases the diffusion (T=10%), but has an unfavourable effect on the threshold voltage which is then higher.

EXAMPLE 4 (FIG. 5)

Figure 5:
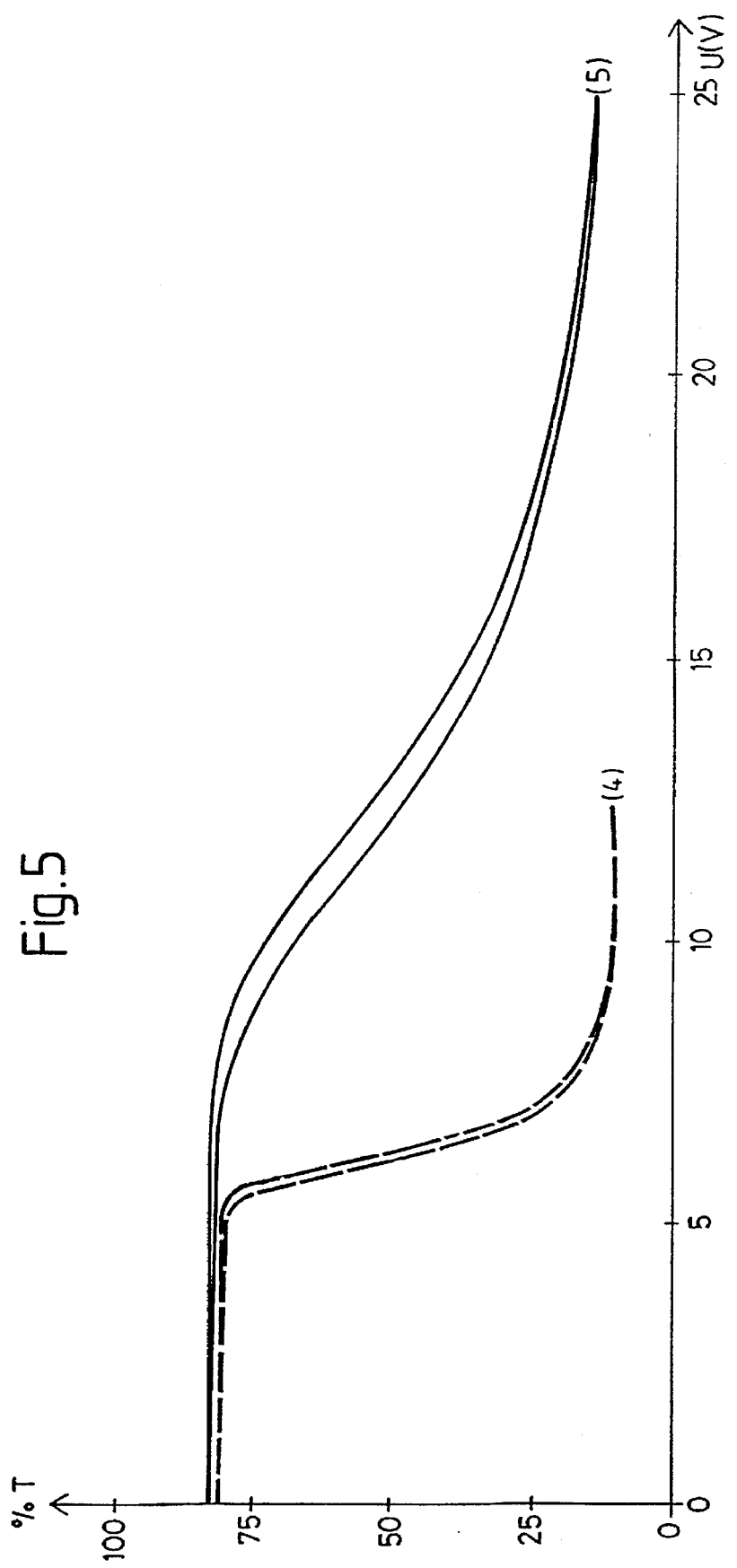

Using a process comparable to that of Example 3 a mixture was produced containing 5% of the compound of formula IIa, known from European patent 0 451 905, dissolved in the liquid crystal E7, 0.5% of chiral agent R 1011 and 0.5% of Irgacure® 369 photo-initiator were added and then polymerised under ultraviolet radiation. Curve 5 of FIG. 5 shows, by comparison with curve 4 of FIG. 4, that the commutation voltage is considerably higher.

In the above-mentioned examples 1 to 4, the alignment of the liquid crystal compositions (liquid crystal and prepolymer) is planar and said composition has positive dielectric anisotropy (>0). When an electric field $\vec{E}$ is applied, the liquid crystal molecules tend to orient themselves in the direction of the field, that is perpendicular to the surface of the electrodes.

EXAMPLE 5 (FIG. 6)

Contrary to the cell corresponding to this example 5, use has been made of a liquid crystal having a negative dielectric anisotropy (<0) and an initial homeotropic structure in which the molecules are oriented perpendicular to the surface of the electrodes. When an electric field $\vec{E}$ is applied, the liquid crystal molecules tend to position themselves in a direction perpendicular to that of the field $\vec{E}$, so that their dipolar moment is either in the direction of this field. This movement of the liquid crystal of negative dielectric anisotropy is impeded by the cross-linking network obtained in situ from the prepolymer according to the invention, and a diffusing appearance is obtained.

Figure 6:
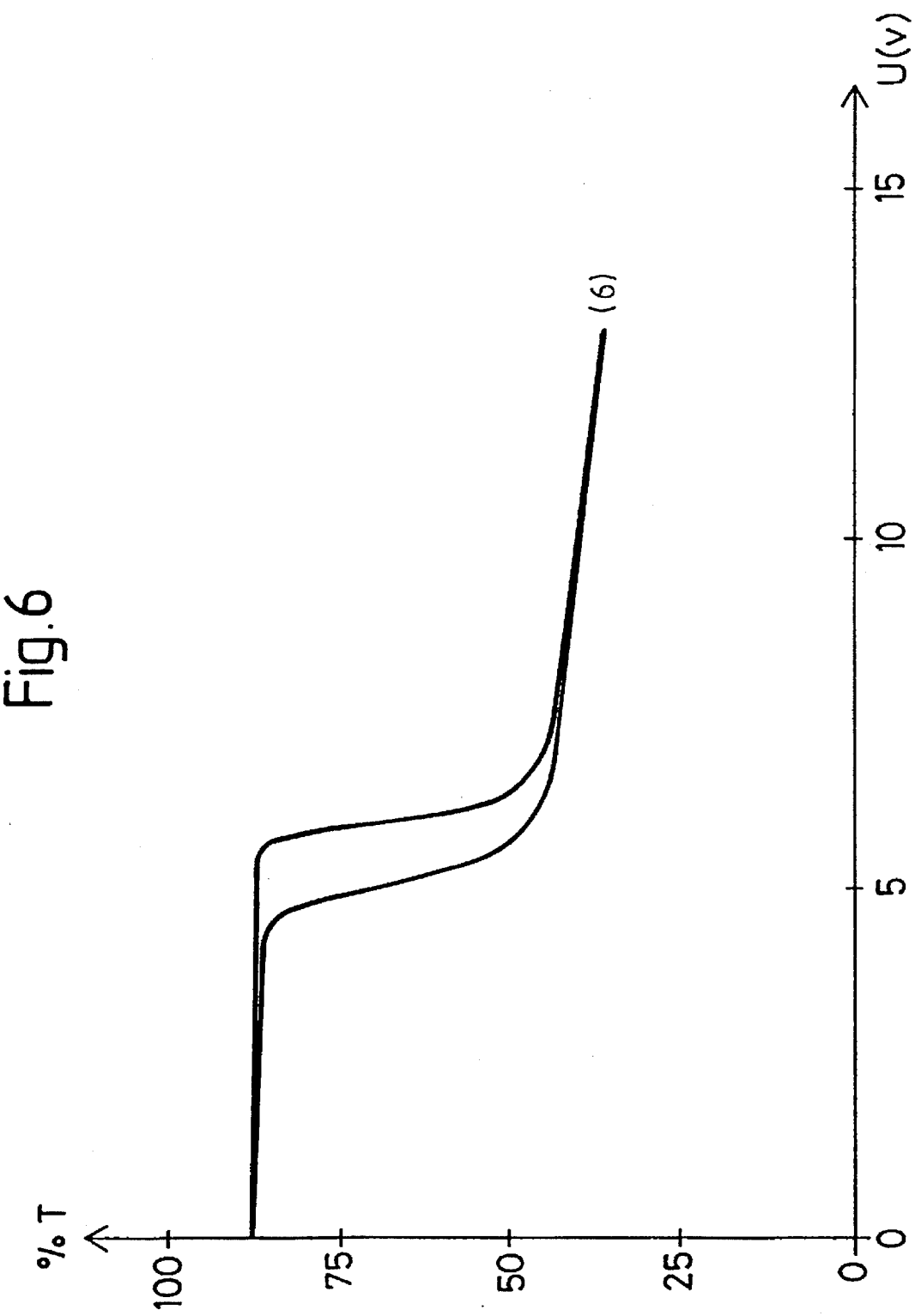

The experiment was conducted using a cell 9 μm thick provided with transparent plates and electrodes and homeotropic alignment layers. The mixture to be introduced into the cell is obtained by dissolving 5% of the prepolymer Ia and 0.25% of chiral agent R 1011 into a liquid crystal of negative dielectric anisotropy, such as the compound ZLI 4788.000 commercially available from Merck, the spiral pitch of which is 12 μm, i.e. the pitch is such that the helical structure cannot form spontaneously in the absence of field, bearing in mind the thickness selected for the cell. No photo-initiator is added. After filling and sealing, the cell is subjected for 5 h to ultraviolet radiation. The cell obtained is perfectly transparent after polymerisation and a diffusing state is obtained by applying an electric field. The curve 6 of FIG. 6 shows the variation in the transmission as a function of the voltage.

The homeotropic orientation may be obtained by treating the opposing surfaces of the cell using a known agent, such as a silane for example commercially available from Petrarch (USA) under the references DMOAP, ODS-M or ODS-E.

EXAMPLE 6 (FIG. 7)

The cell produced according to this example shows that it is also possible to obtain a liquid crystal composition by not only creating the reticulated network on the basis of a prepolymer of formula I according to the invention, but by simultaneously using a different monomer to form a copolymer.

Into a 9 m cell provided with plates and transparent electrodes and alignment layers there is introduced a mixture composed of the liquid crystal E7 into which has been dissolved 0.25% of chiral agent R 1011, 5% of prepolymer Ia and 0.5% of ZONYL® of Dupont de Nemours, isotropic monomer of the fluoroalkyl-methacrylate type, then exposed for at least 4 hours to ultraviolet radiation.

By way of comparison, a second cell was prepared in exactly the same way without adding the monomer ZONYL®.

Figure 7:
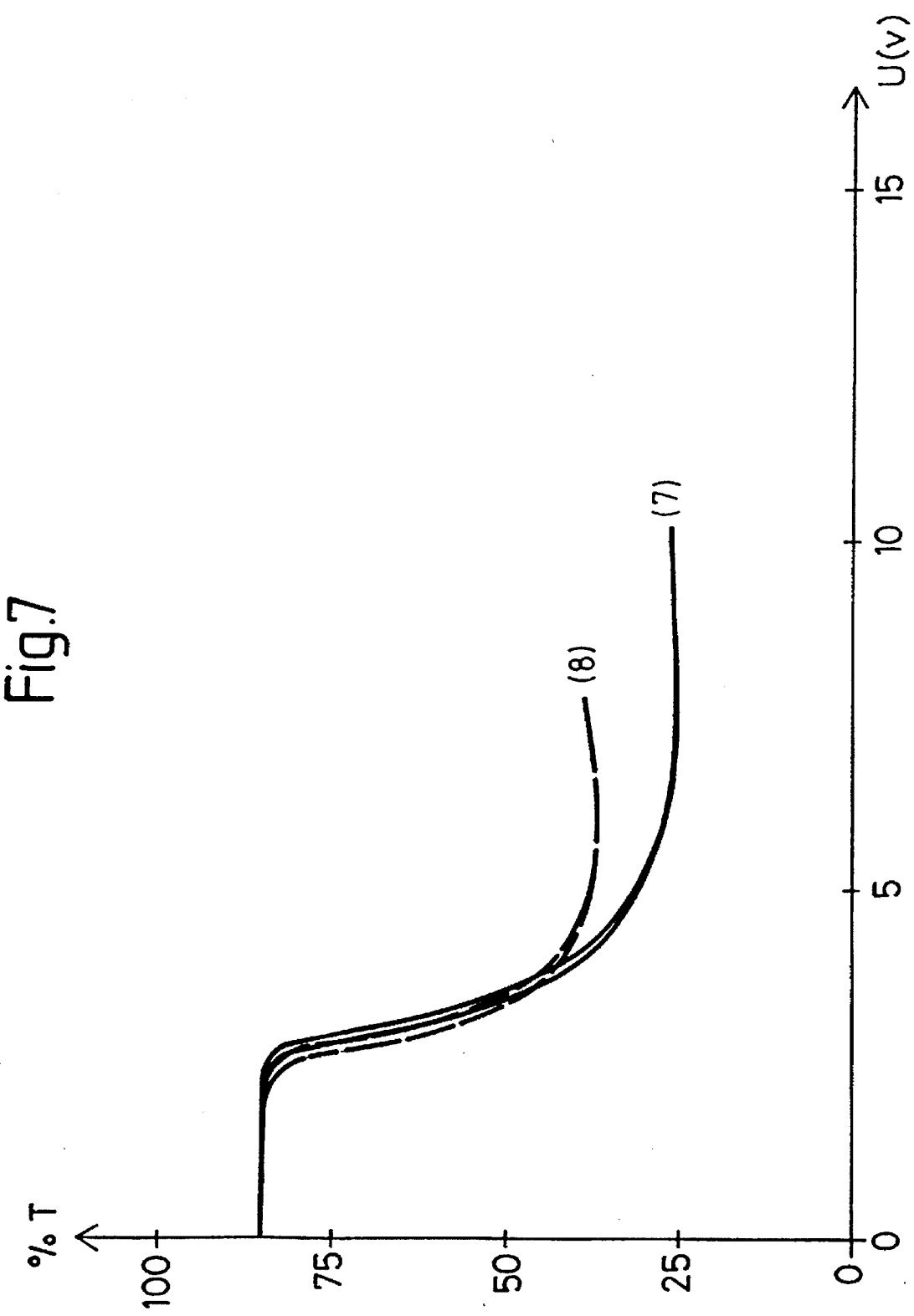

FIG. 7 shows the variation in the transmission percentage as a function of the voltage with the copolymer Ia—ZONYL® (curve 7) and with the polymer Ia alone (curve 8). It will be noted that, in the commutated state, the cell with the copolymer has a higher diffusing state, i.e. a smaller transmission percentage.

Comparable results were obtained with other copolymerisable isotropic products such as other ZONYL® products of Dupont de Nemours or FLUORAD® products sold by 3M.

It was also noted that the electro-optical features of the system could be modified by varying the concentration of the second copolymerisable compound in the mixture.

Figure 8:
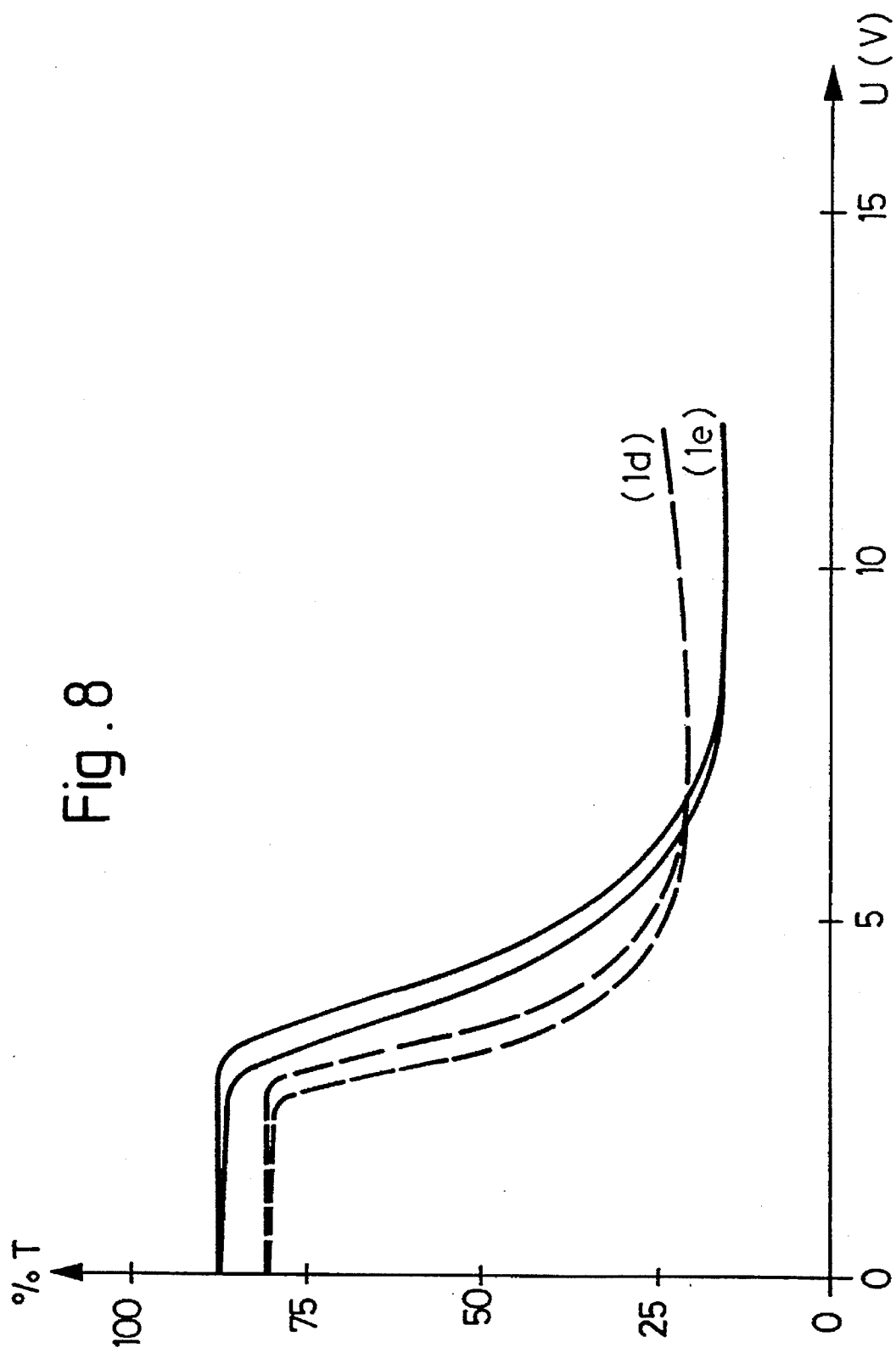
Figure 9:
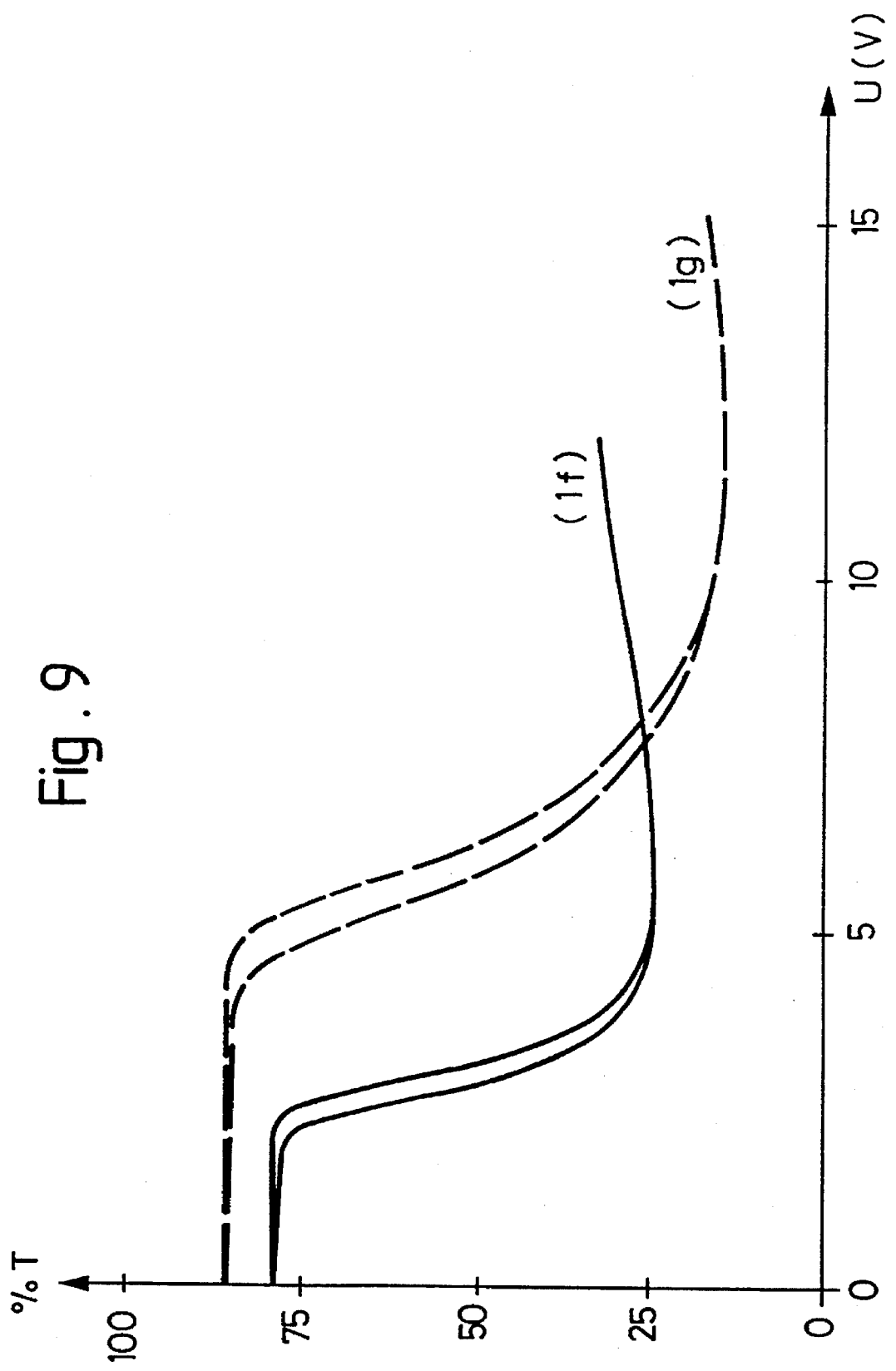

EXAMPLE 7 (FIGS. 8 and 9)

According to a process similar to that of example 1, cells with electrodes spaced 9 μm apart have been made including as liquid crystal composition the compound E7, 0.25% of the chiral agent R 1011 and one of the compound Id to Ig according to the invention. The pourcentages of compound Id to Ig in the liquid crystal composition and the polymerisation conditions are mentioned in table II.

TABLE II

| | Id | Ie | If | Ig |
|---|---|---|---|---|
| Percentage | 4,99% | 1,99% | 1,99% | 7% |
| Photo-initiator | Aucun | Aucun | Aucun | 0,1% IC369 |
| Polymerisation duration | 15 h. | 4 h. | 2 h. | 2 h. |

The electro optical properties of the cell thus obtained were then evaluated as mentioned in example 1 and are represented by the curves 1d and 1e in FIG. 8 for the compound Id and Ie, and by the curves if and 1g in FIG. 9 for the compound If and Ig.

In Examples 1 to 7 which have just been described, it was always assumed that the two electrodes were transparent and covered the entire surface of each transparent support, that is, that the cell acted, in fact, like an optical valve. According to processes known to the person skilled in the art it is also possible to arrange at least one of the electrodes into segments capable of being selectively placed under voltage via the intermediary of a control circuit to form a graphic, numeric or alphanumeric display cell. Similarly, it is possible, when the cell permits a display, to increase the contrast in known manner by adding a reflector when constructing the cell and/or by incorporating a dichroic dye into the liquid crystal composition.

We claim:

1. A liquid crystal composition in the form of an anisotropic gel which is transparent in a non-commutated state and opaque when a slightly elevated electric field is applied, having a low molecular weight liquid crystal inside of which is formed a cross-linking network obtained by polymerisation of a prepolymer, wherein said prepolymer is not a liquid crystal and its chemical structure is such that the network formed by polymerisation presents a degree of order intermediate between that of an oriented network obtained from a prepolymeric liquid crystal and that of a network which is not ordered and which is obtained using a strictly isotropic prepolymer.

2. A liquid crystal composition according to claim 1, wherein the non-liquid crystal prepolymer corresponds to the following formula I:

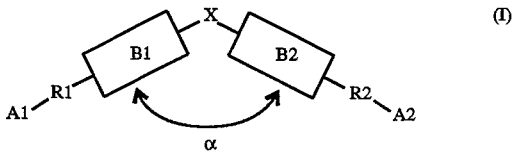

(I)

in which:

X is a non-mesogenic bivalent central group the free bonds of which form an angle smaller than 180°, said central group being selected from the groups diphenylether, diphenylmethane, 2,2-diphenyl propane, diphenylthioether, diphenylsulfone and 1,2 or 1,3 phenylene, said groups being unsubstituted or substituted by one or more alkyl, alkoxy, trifluoromethyl or halogen;

$B_1$ and $B_2$ are rigid cyclic groups selected from the groups phenyl, benzoate, biphenyl, pyrimidine, dioxane and cyclohexyl;

$R_1$ and $R_2$ are the same or different, each representing an alkyl, alkoxy, aralkyl or aralkoxy chain;

$A_1$ and $A_2$ are the same or different, each representing a reactive polymerisable function selected from an acrylate, a methacrylate, a vinyl and an epoxy.

3. A liquid crystal composition according to claim 2, wherein the prepolymer of formula I is selected from among 4,4'-bis{4-[6-(acryloyloxy)hexyloxy]-benzoate}phenylether, 4,4'-bis{4-[6-(acryloyloxy)hexyloxy]-benzoate}diphenylenemethane, or 4,4'-bis{4-[6-(acryloyloxy)hexyloxy]benzoate}diphenylene-2,2-propane.

4. A liquid crystal composition according to claim 1, wherein the liquid crystal present in the composition has positive dielectric anisotropy.

5. A liquid crystal composition according to claim 1, wherein the liquid crystal present in the composition has a negative dielectric anisotropy.

6. A liquid crystal composition according to claim 2, which contains between 1% and 20%, preferably between 3% and 8% of prepolymer of formula I.

7. A liquid crystal composition according to claim 2, wherein the cross-linking network is obtained by adding another copolymerisable monomer to the prepolymer of formula I.

8. A liquid crystal composition according to claim 7, wherein the other copolymerisable monomer is also a prepolymer of formula I.

9. A process for obtaining a liquid crystal composition according to claim 1, wherein the cross-linking network is formed by polymerisation or copolymerisation under ultra-violet radiation.

10. A process according to claim 9, wherein the polymerisable mixture also contains a photo-initiator.

11. A liquid crystal cell comprising two opposing transparent supports provided on their inside faces with transparent electrodes connected to a voltage source via the intermediary of a control circuit, said cell being closed by a sealing frame to receive in the space delimited by the supports and the sealing frame a liquid crystal composition, wherein said liquid crystal composition comprises a low molecular weight liquid crystal in the interior of which a cross-linking network is formed by polymerisation of a non-liquid crystal prepolymer, such as defined in claim 2.

12. A liquid crystal cell according to claim 11, wherein at least one of the transparent electrodes is arranged in segments adapted to be selectively placed under voltage to form a graphic, numeric or alphanumeric display cell.

13. A liquid crystal cell according to claim 12, which also has a reflector.

14. A liquid crystal cell according to claim 11, wherein the liquid crystal composition also contains a dichroic dye.

15. A liquid crystal composition according to claim 2, wherein the central group is unsubstituted.

16. A liquid crystal composition according to claim 2, wherein $R_1$ and $R_2$ have an alkylene link having 1 to 12 carbon atoms.

17. A liquid crystal composition according to claim 2, wherein $R_1$ and $R_2$ have an alkylene link having 6 carbon atoms.

* * * * *